(No Model.)
W. LOUDEN.
SPREADER BAR FOR HARNESS TRACES.
No. 548,319. Patented Oct. 22, 1895.
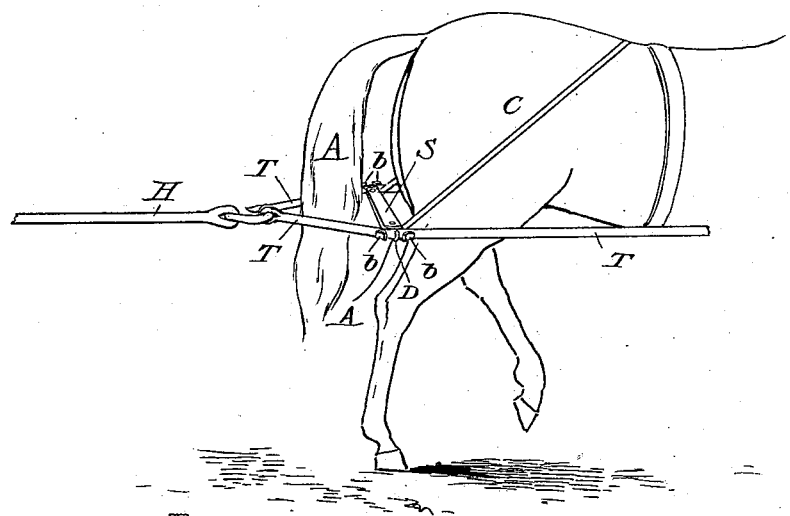
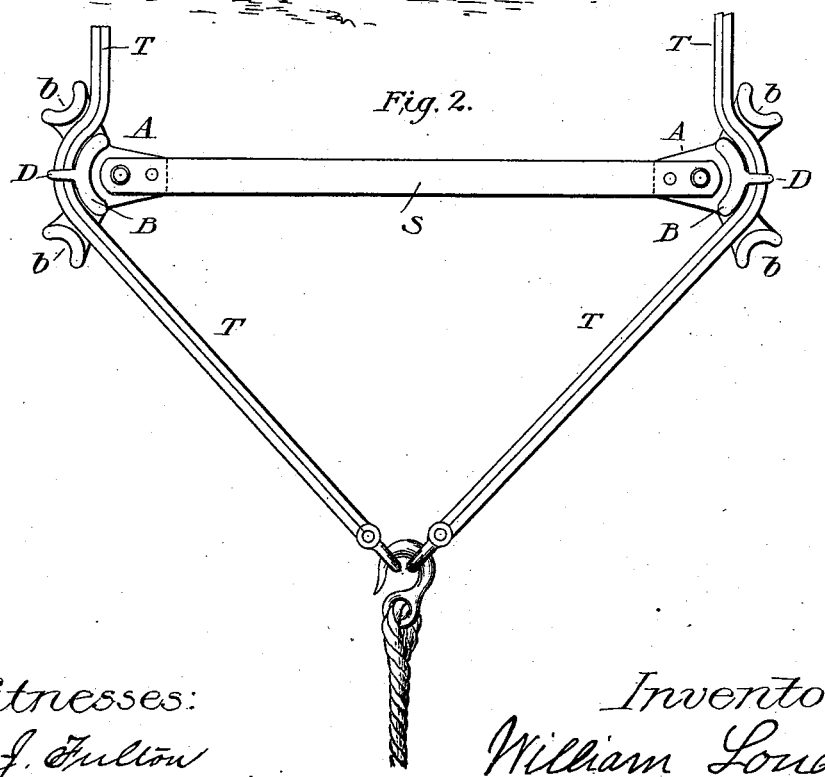
Witnesses:
C. J. Fulton
Inventor:
William Louden

UNITED STATES PATENT OFFICE.

WILLIAM LOUDEN, OF FAIRFIELD, IOWA.

SPREADER-BAR FOR HARNESS-TRACES.

SPECIFICATION forming part of Letters Patent No. 548,319, dated October 22, 1895.

Application filed April 18, 1893. Serial No. 470,919. (No model.)

*To all whom it may concern:*

Be it known that I, WILLIAM LOUDEN, a citizen of the United States, residing at Fairfield, in the county of Jefferson and State of Iowa, have invented a new and useful Improvement in Trace-Spreaders for Horses' Harness, of which the following is a specification.

My invention relates to spreaders to hold the traces of harness from rubbing against the sides of the horse while the ends of the traces are brought together to connect to the draft-rope or other instrument to which it is hitched; and it consists in fitting the ends of the spreader with clamping devices to engage and hold the traces wherever it may be placed upon them, and that while the traces are clamped or crimped upon the ends of the spreader they will not be injured by their contact therewith.

In the accompanying drawings, representing the invention, Figure 1 is a perspective showing the application of the spreader to the harness in actual use. Fig. 2 is an enlarged top view showing in detail the application of the spreader to the harness-traces.

This device is intended for use with harness having long traces which have to be hitched up close to the horse to keep the spreaders in ordinary use from striking the horse's heels, as in hoisting with a block and tackle, plowing ice, &c. The spreader S, which is made of sufficient length to hold the traces out from the sides of the horse, is fitted at each end with a casting A, which has a wide semicircular or arcuated flange B, and also with two smaller flanges *b b*, which may be also arcuated, and are so set that when the trace is placed between these flanges it will be crimped and held from slipping back and forth in the casting A. The trace is further held from slipping out from between the flanges by the finger D.

The traces are hooked to the hoisting-rope H in any suitable manner, and the spreader is adjusted upon them immediately in the rear of the horse, as shown in Fig. 1. By this means the ordinary singletree may be dispensed with and the traces hitched directly to draft. A cord C, passing over the horse's rump, may also be used to hold the spreader and traces up from the horse's hocks.

Various forms of clamping devices may be used to hold the traces securely to the spreader without departing from the spirit of my invention.

Having thus described my invention, what I claim as new, and desire to secure by Letters Patent, is—

1. The combination with harness traces of a spreader having a casting on each end, said casting having arcuated flanges B, *b*, *b*, set so as to present their convex faces to the trace and to crimp it between them, substantially as set forth.

2. The combination with harness traces of a spreader having a casting on each end, said casting having arcuated flanges B, *b*, *b*, set so as to present their convex faces to the trace and to crimp it between them, and a finger to hold the trace in engagement therewith.

In testimony whereof I have signed this specification in the presence of two subscribing witnesses.

WILLIAM LOUDEN.

Witnesses:
   H. C. RANEY,
   J. C. THORNE.